US009249007B2

(12) United States Patent
Whaley

(10) Patent No.: US 9,249,007 B2
(45) Date of Patent: Feb. 2, 2016

(54) ICE MACHINE RISERS

(71) Applicant: Buc-ee's Ltd., Lake Jackson, TX (US)

(72) Inventor: Terry Whaley, Richmond, TX (US)

(73) Assignee: BUC-EE'S LTD., Lake Jackson, TX (US)

( * ) Notice: Subject to any disclaimer, the term of this patent is extended or adjusted under 35 U.S.C. 154(b) by 0 days.

(21) Appl. No.: 14/684,573

(22) Filed: Apr. 13, 2015

(65) Prior Publication Data
US 2015/0336787 A1 Nov. 26, 2015

Related U.S. Application Data

(60) Provisional application No. 62/002,382, filed on May 23, 2014.

(51) Int. Cl.
| | |
|---|---|
| *F16M 1/00* | (2006.01) |
| *B67D 1/08* | (2006.01) |
| *E05F 5/06* | (2006.01) |
| *F16M 13/02* | (2006.01) |
| *E06B 5/00* | (2006.01) |
| *F25C 5/00* | (2006.01) |

(52) U.S. Cl.
CPC ............... *B67D 1/0889* (2013.01); *E05F 5/06* (2013.01); *E06B 5/00* (2013.01); *F16M 1/00* (2013.01); *F16M 13/02* (2013.01); *F25C 5/002* (2013.01)

(58) Field of Classification Search
CPC .. B67D 1/0889; B67D 1/0891; B67D 1/0894; F16M 13/02; F16M 1/00; E05F 5/06; F25C 5/002; E06B 5/00
USPC ............... 248/672, 673, 678, 346.01, 346.03, 248/346.07; 62/344; 221/96, 282, 286; 222/129.1, 146.6
See application file for complete search history.

(56) References Cited

U.S. PATENT DOCUMENTS

| | | | | |
|---|---|---|---|---|
| 3,198,389 | A * | 8/1965 | Dunning | A47K 5/18 221/63 |
| 4,901,887 | A * | 2/1990 | Burton | B67D 1/0858 222/129.1 |
| 6,880,358 | B2 * | 4/2005 | Lucas | F25C 5/007 222/146.6 |
| 7,168,261 | B2 | 1/2007 | Grewal et al. | 62/340 |
| 7,263,853 | B2 | 9/2007 | Zizas | 62/344 |
| 8,245,999 | B2 | 8/2012 | Tartan et al. | 248/678 |
| 2004/0263032 | A1 * | 12/2004 | Cho | A47B 67/04 312/330.1 |
| 2009/0255221 | A1 * | 10/2009 | Lyman, Jr. | B65B 31/046 53/512 |
| 2009/0278024 | A1 | 11/2009 | K.V. et al. | 248/678 |
| 2010/0116847 | A1 * | 5/2010 | Foroughi | B67D 1/0004 222/81 |
| 2010/0201236 | A1 * | 8/2010 | Kim | D06F 39/125 312/228 |
| 2012/0070264 | A1 * | 3/2012 | Pape | B65B 3/06 414/794.4 |
| 2012/0199603 | A1 * | 8/2012 | Avezzano | G07F 13/065 221/96 |
| 2014/0199151 | A1 * | 7/2014 | Pape | B65G 57/30 414/791.6 |

* cited by examiner

*Primary Examiner* — Mark Wendell
(74) *Attorney, Agent, or Firm* — Norton Rose Fulbright US LLP

(57) ABSTRACT

This disclosure includes ice machine riser apparatuses and methods of using the same. Some of the present riser apparatuses include a housing that defines an interior channel and has a first end defining a first opening and configured to be coupled to an ice machine, a second end defining a second opening and configured to be coupled to a drink dispenser, and sidewall(s) extending between the first end and the second end and defining at least a third opening, and in some riser apparatuses a fourth opening, in direct communication with the interior channel, a door configured to selectively cover the third opening, and a removable cover configured to cover at least a portion of the fourth opening. Some riser apparatuses elevate an ice machine relative to a drink dispenser. Some riser apparatuses include a third opening disposed at a non-parallel angle relative to the first opening.

21 Claims, 4 Drawing Sheets

ICE MACHINE RISERS

CROSS-REFERENCE TO RELATED APPLICATIONS

This application claims priority to U.S. Provisional Patent Application No. 62/002,382, filed May 23, 2014, which is incorporated by reference in its entirety.

BACKGROUND

1. Field of Invention

This invention relates generally to ice machines and drink dispensers, and more particularly, but not by way of limitation, to ice machine riser apparatuses for coupling ice machines to drink dispensers.

2. Description of Related Art

Ice machine adapters are generally used to couple an ice machine to a drink dispenser such that the ice machine can deliver ice directly to the drink dispenser. Such ice machine adapters typically locate a lower end of an ice machine immediately above an upper end of a drink dispenser or soda fountain. Examples of such adapters are disclosed in: (1) U.S. Pat. No. 7,168,261; (2) U.S. Pat. No. 7,263,853; (3) U.S. Pat. No. 8,245,999; and (4) Patent Application Pub. No. US 2009/0278024.

SUMMARY

Some embodiments of the present riser apparatuses can be configured, through a body having a first end coupled to an ice machine to a second end coupled to a drink dispenser, to elevate the ice machine relative to the drink dispenser, such as, for example, to provide adequate space for repair, cleaning, manual loading of ice, and/or the like, without requiring removal of the ice machine. Some embodiments can be configured, through a door covering an opening defined through a sidewall of the body, to facilitate access to certain components and/or areas of an ice machine, ice machine riser apparatus, and/or drink dispenser, such as, for example, to provide for repair, cleaning, manual loading of ice, and/or the like, without requiring removal of the ice machine.

Some embodiments of the present riser apparatuses (e.g., for mounting an ice machine above a drink dispenser) comprise: a housing defining an interior channel (e.g., the housing comprising: a first end defining a first opening, the first end configured to be coupled to an ice machine such that ice can pass through the first opening and into the interior channel; a second end defining a second opening, the second end configured to be coupled to a drink dispenser such that ice can pass from the interior channel and out of the housing through the second opening; and one or more sidewalls extending between the first end and the second end, the one or more sidewalls defining third and fourth openings in direct communication with the interior channel); a door coupled to at least one of the one or more sidewalls such that the door selectively covers the third opening; and a cover member removably coupled to at least one of the one or more sidewalls such that the cover member covers at least a portion of the fourth opening. In some embodiments, a height of the housing is at least 35% of a minimum outer transverse dimension of the housing. In some embodiments, a single one of the sidewalls defines at least a majority of each of the third and fourth openings. In some embodiments, the third opening is disposed longitudinally between the fourth opening and the first end. In some embodiments, the third opening and the fourth opening are unitary. In some embodiments, the second opening and the fourth opening are unitary. In some embodiments, the removable cover has a shelf portion that extends away from the housing when the removable cover is coupled to the housing. In some embodiments, the third opening is angularly disposed at a non-parallel angle relative to the second opening.

Some embodiments of the present riser apparatuses (e.g., for mounting an ice machine above a drink dispenser), comprise: a housing defining an interior channel (e.g., the housing comprising: a first end defining a first opening, the first end configured to be coupled to an ice machine such that ice can pass through the first opening and into the interior channel; a second end defining a second opening, the second end configured to be coupled to a drink dispenser such that ice can pass from the interior channel and out of the housing through the second opening; and one or more sidewalls extending between the first end and the second end, the one or more sidewalls defining a third opening in direct communication with the interior channel, the third opening disposed at a non-parallel angle relative to the first opening); and a door coupled to at least one of the one or more sidewalls such that the door selectively covers the third opening. In some embodiments, a height of the housing is at least 35% of a minimum outer transverse dimension of the housing. In some embodiments, the riser apparatus is configured to be coupled to the drink dispenser such that a portion of at least one of the sidewalls extends past an upper end of the drink dispenser. In some embodiments, the housing includes an internal ledge recessed from the second end and configured to rest on the drink dispenser. In some embodiments, the door is pivotally coupled to at least one of the sidewalls. In some embodiments, a lower end of the door is pivotally coupled to at least one of the sidewalls. In some embodiments, the door is pivotally coupled to the housing such that a maximum angular displacement of the door relative to the housing is limited to an acute angle. Some embodiments further comprise: a releasable stop configured to limit the maximum angular displacement of the door relative to the housing to an acute angle. Some embodiments further comprise: a latch configured to releasably secure the door in the closed position. In some embodiments, at least one of the sidewalls comprises an outer wall and an inner wall. In some embodiments, at least one of the sidewalls comprises a tubular frame member disposed between an outer wall and an inner wall. In some embodiments, the housing comprises stainless steel.

Some embodiments of the present methods (e.g., for adding ice to a drink dispenser, or cleaning or repairing an ice machine or drink dispenser, through a riser apparatus coupled to the ice machine at a first end and coupled to the drink dispenser at a second end) comprise: opening a door attached to the riser apparatus to access an opening defined by one or more sidewalls of the riser apparatus such that the opening is in direct communication with an interior channel extending between the first and second ends of the riser apparatus; where the sidewalls extend from the first end to the second end and the opening is in direct communication with an interior channel of the riser apparatus.

The term "coupled" is defined as connected, although not necessarily directly, and not necessarily mechanically; two items that are "coupled" may be unitary with each other. The terms "a" and "an" are defined as one or more unless this disclosure explicitly requires otherwise. The term "substantially" is defined as largely but not necessarily wholly what is specified (and includes what is specified; e.g., substantially 90 degrees includes 90 degrees and substantially parallel includes parallel), as understood by a person of ordinary skill in the art. In any disclosed embodiment, the terms "substantially," "approximately," and "about" may be substituted with "within [a percentage] of" what is specified, where the percentage includes 0.1, 1, 5, 10, and 20 percent.

Further, a device or system that is configured in a certain way is configured in at least that way, but it can also be configured in other ways than those specifically described.

The terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, an apparatus that "comprises," "has," "includes," or "contains" one or more elements possesses those one or more elements, but is not limited to possessing only those elements. Likewise, a method that "comprises," "has," "includes," or "contains" one or more steps possesses those one or more steps, but is not limited to possessing only those one or more steps.

Any embodiment of any of the apparatuses, systems, and methods can consist of or consist essentially of—rather than comprise/include/contain/have—any of the described steps, elements, and/or features. Thus, in any of the claims, the term "consisting of" or "consisting essentially of" can be substituted for any of the open-ended linking verbs recited above, in order to change the scope of a given claim from what it would otherwise be using the open-ended linking verb.

The feature or features of one embodiment may be applied to other embodiments, even though not described or illustrated, unless expressly prohibited by this disclosure or the nature of the embodiments.

Some details associated with the embodiments described above and others are described below.

BRIEF DESCRIPTION OF THE DRAWINGS

The following drawings illustrate by way of example and not limitation. For the sake of brevity and clarity, every feature of a given structure is not always labeled in every figure in which that structure appears. Identical reference numbers do not necessarily indicate an identical structure. Rather, the same reference number may be used to indicate a similar feature or a feature with similar functionality, as may non-identical reference numbers. The figures are drawn to scale (unless otherwise noted), meaning the sizes of the depicted elements are accurate relative to each other for at least the embodiment depicted in the figures.

DESCRIPTION OF ILLUSTRATIVE EMBODIMENTS

Figure 1A:
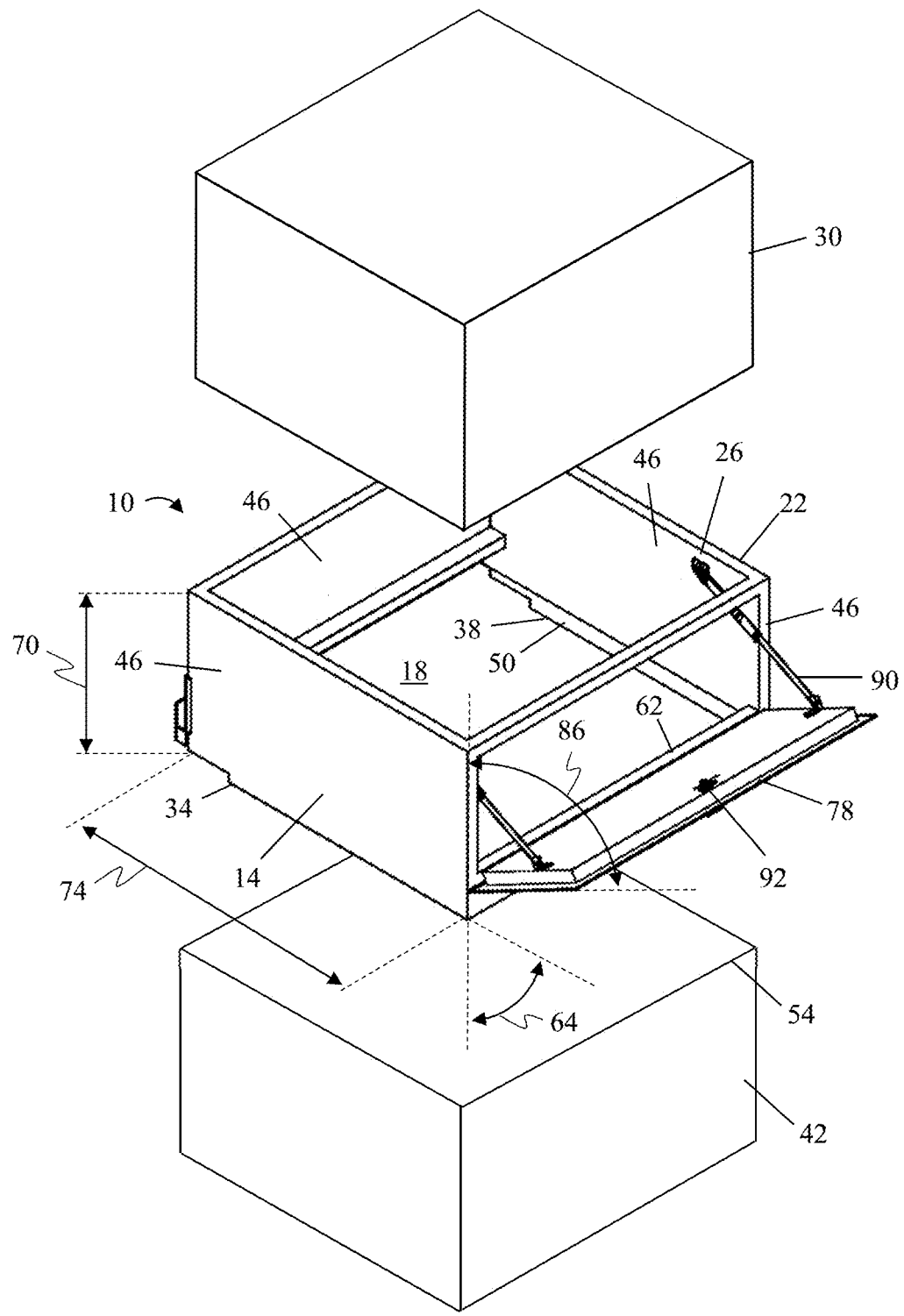
FIG. 1A depicts an upper perspective view of a first embodiment of the present ice machine riser apparatuses, shown with an ice machine and a drink dispenser.

Referring now to the drawings, and more particularly to FIGS. 1A-1E, shown therein and designated by the reference numeral 10 is a first embodiment of the present riser apparatuses. In the embodiment shown, riser apparatus 10 comprises a housing 14 defining an interior channel 18 that extends from a first end 22 of housing 14 to a second end 34. In this embodiment, housing 14 comprises one or more sidewalls 46 (e.g., four (4) sidewalls, as shown) that extend between first end 22 and second end 34 (e.g., and define at least a portion of interior channel 18, as shown). In the embodiment shown, housing 14, as defined by sidewalls 46, generally comprises a rectangular cross-sectional shape, however, in other embodiments, housing 14 can comprise any suitable shape that can be defined by any suitable number of sidewalls, for example, 1, 2, 3, 4, 5, 6, 7, 8, or more sidewalls that can generally define a (or a portion of a) circular, triangular, or other cross-sectional shape, and/or any other shape that permits the functionality described in this disclosure. In the embodiment shown, interior channel 18 has a substantially constant cross-sectional shape; however, in other embodiments, the interior channel can vary between the first end to the second end.

In the embodiment shown, first end 22 defines a first opening 26 and is configured to be coupled to an ice machine 30 such that ice (e.g., generated by ice machine 30) can pass through first opening 26 and into interior channel 18. In this embodiment, ice machine 30 is coupled to housing 14 in that apparatus 10 is configured such that ice machine 30 can rest on top of and/or within first end 22. For example, in some embodiments, at least a portion of ice machine 30 can be received within a recessed portion of first end 22 (e.g., and rest against an internal ledge of interior channel 18), similar to as described below for drink dispenser 42 and second end 34. In some embodiments, apparatus 10 can be coupled to ice machine 30 with alternative and/or additional structure(s), such as, for example, fasteners, such as screws, rivets, nuts and bolts, and/or the like, adhesives, straps, and/or the like.

Figure 1B:
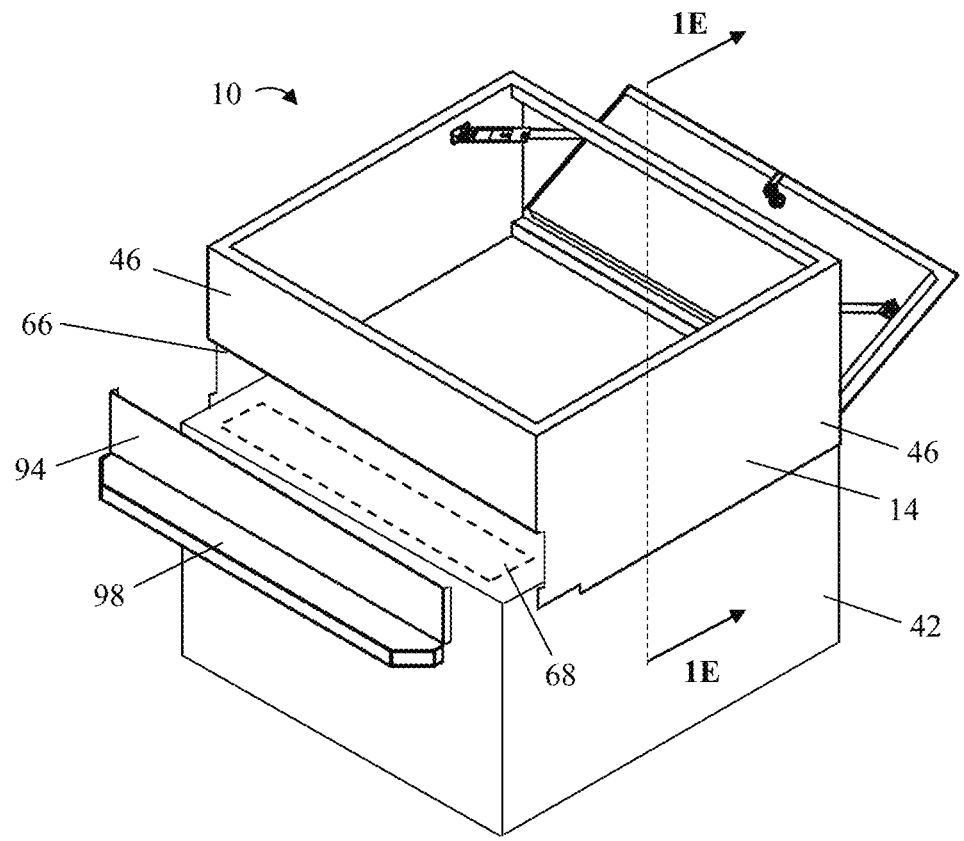
FIG. 1B depicts an upper perspective view of the riser apparatus of FIG. 1 above a drink dispenser.
Figure 1C:
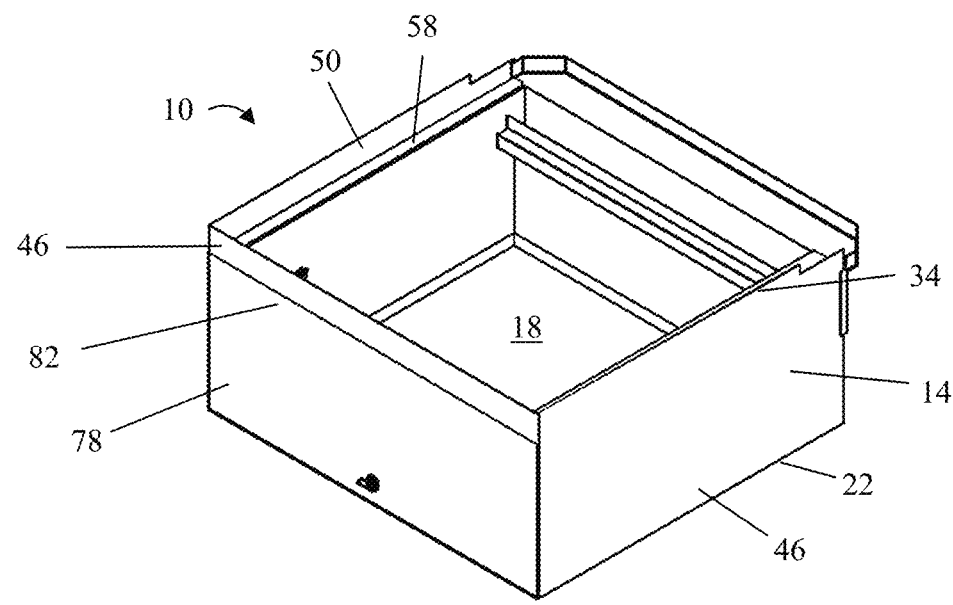
FIG. 1C and 1D depict lower perspective and bottom views, respectively, of the riser apparatus of FIG. 1.
Figure 1D:
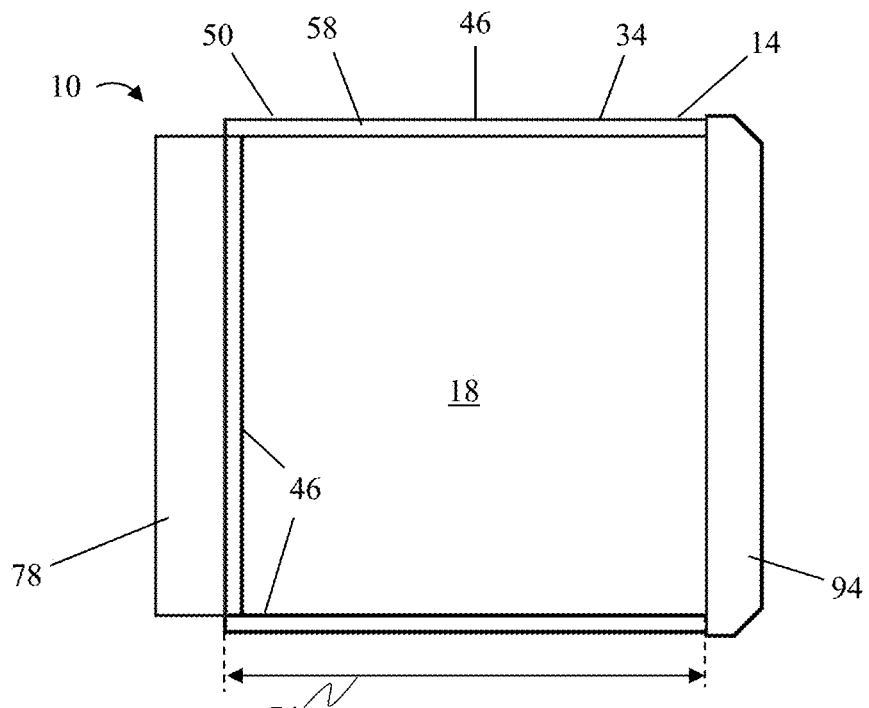
Figure 1E:
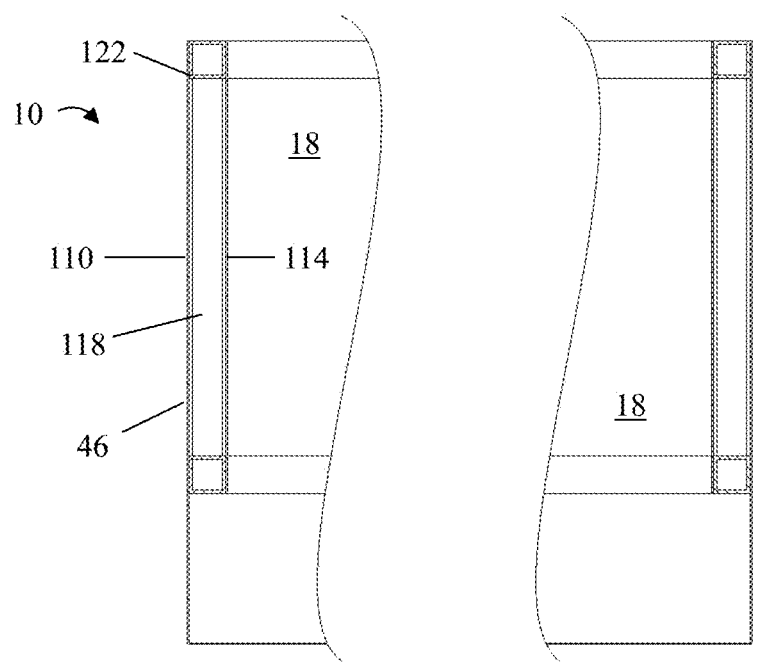
FIG. 1E depicts an enlarged, partially cutaway cross-sectional side view of the riser apparatus of FIG. 1.

In the embodiment shown, second end 34 defines a second opening 38 and is configured to be coupled to a drink dispenser 42 such that ice can pass from interior channel 18 and out of housing 14 (e.g., and into drink dispenser 42) through second opening 38. In some embodiments, sidewalls 46 can be configured to facilitate coupling of the apparatus to the drink dispenser, for example, in the embodiment shown, apparatus 10 is configured to be coupled to drink dispenser 42 such that a portion 50 of at least one of sidewalls 46 extends past an upper end 54 of drink dispenser 42 (e.g., as shown in FIG. 1B). For example, in this embodiment, housing 14 includes an internal ledge 58 recessed from second end 34 and configured to rest on upper end 54 of drink dispenser 42 (e.g., such that at least a portion of drink dispenser 42 is received within second end 34 and rests against internal ledge 58). In this way, apparatus 10 can be secured and/or located relative to drink dispenser 42, such as, for example, to reduce the risk of inadvertent separation of the apparatus from the drink dispenser, which could result in spillage and/or injury. In other embodiments, drink dispenser 42 can be coupled to apparatus 10 through alternative and/or additional structure(s), such as, for example, fasteners, such as screws, rivets, nuts and bolts, and/or the like, adhesives, straps, and/or the like.

In the embodiment shown, sidewalls 46 define a third opening 62 and a fourth opening 66, each in direct communication with interior channel 18. For example, in the embodiment shown, the third and fourth openings are configured to permit immediate access to interior channel 18 (or at least a primary portion of interior channel 18 that is configured to extend directly from ice machine 30 to drink dispenser 42), without requiring navigation of any obstructions (other than doors or covers), secondary passageways or channels, and/or the like. In this way, the third and fourth openings can be used to access components and/or areas of ice machine 30, apparatus 10, and/or drink dispenser 42 without requiring removal of the ice machine (e.g., to facilitate cleaning or repair and/or manual loading of ice into the drink dispenser and/or riser apparatus). In the embodiment shown, third opening 62 (e.g., or a portion thereof) is disposed at a non-parallel (e.g., perpendicular, as shown) angle 64 relative to second opening 38 (e.g., second and third openings, 38 and 62, respectively, do not lie in the same plane in this embodiment). In this way, third opening 62 is configured to facilitate direct access to interior channel 18 and/or access to components of ice machine 30 and/or drink dispenser 42 without requiring removal of the ice machine from the riser apparatus. In the embodiment shown, angle 64 is substantially equal to 90 degrees (e.g., +/−5 degrees); however, in other embodiments, angle 64 can be any suitable angle, such as, for example, greater than or equal to any one of, or between any two of: 30, 45, 60, 75, 90, 105, 120, or more degrees.

In the embodiment shown, fourth opening 66 is defined by at least one sidewall 46 at a location closer to second end 34 than to first end 22. For example, in this embodiment, fourth opening 66 is unitary with second opening 38 (e.g., the fourth opening and the second opening form a single continuous opening). In this way, fourth opening 66 can be configured to allow access to any controls 68 which may be disposed on top of drink dispenser 42 (e.g., through removal of removable cover 94, as shown in FIG. 1B). In the embodiment shown, fourth opening 66 is defined on a opposite side of housing 14 from third opening 62. In this way, fourth opening 66 can facilitate evacuation of apparatus 10, by allowing ice, contaminants, cleaning materials, and/or the like to be pushed from third opening 62 and out of fourth opening 66. However, in other embodiments, the fourth opening can be defined on a side of the housing that is adjacent to the third opening, on the same side as the third opening (e.g., and may be unitary with the third opening, as described in more detail below), or either of the third and fourth openings can be omitted.

In the embodiment shown, body 14 is configured to support ice machine 30 a distance above drink dispenser 42 (such that the bottom of the ice machine is elevated relative to the top of the drink dispenser). For example, in the embodiment shown, a height 70 of housing 14 is at least 35% of a minimum outer transverse dimension 74 of the housing (e.g., which, as shown, may not include shelf portion 98 of removable cover 94). For example, in the embodiment shown, height 70 can be approximately 12 inches (in) and minimum transverse dimension 74 can be approximately 29 in such that the height is approximately 40% of the minimum transverse dimension. Elevation of the ice machine relative to the drink dispenser enables riser apparatus 10 to store and/or receive ice, and/or facilitate cleaning and/or repair of, and/or manual loading of ice into apparatus 10 and/or drink dispenser 42 (e.g., through third opening 62 and/or fourth opening 66).

In the embodiment shown, apparatus 10 comprises a door 78 coupled to at least one sidewall 46 (e.g., one (1) sidewall 46, as shown) and configured to selectively cover third opening 62. In this embodiment, door 78 is pivotally coupled to the at least one sidewall (e.g., with a hinge), however, in other embodiments, door 78 can be slidably coupled to and/or completely removable from the at least one sidewall. In the embodiment shown, a lower end 82 of door 78 (e.g., an end of the door closer to second end 34 than to first end 22) is pivotally coupled to at least one sidewall 46 by a piano hinge. In this way, door 78 can be configured to open towards second end 34 (e.g., as shown), for example, to facilitate manual loading of ice into apparatus 10 and/or drink dispenser 42 and/or to minimize risk of spillage when door 78 is opened (e.g., door 78 can act as a funnel to support and direct ice into interior channel 18 when door 78 is opened). In the embodiment shown, door 78 is pivotally coupled to the housing such that a maximum angular displacement of the door relative to the housing is limited to an acute angle 86 (e.g., such that door 78, when opened, can function as a chute for loading ice into apparatus 10 and/or drink dispenser 42 and/or minimize risk of spillage).

In the embodiment shown, the maximum angular displacement of the door relative to the housing is limited via operation of a releasable stop. For example, in this embodiment, the releasable stop comprises one or more safety hinges 90, such as, for example, two releasable safety hinges 90 that prevent door 78 from opening past acute angle 86. In other embodiments, the releasable stop can comprise any suitable different and/or additional structure, such as, for example, safety wires, struts, bump stops, and/or the like. In the embodiment shown, apparatus 10 further comprises a latch 92 (e.g., a thumb latch) configured to releasably secure door 78 in a closed position.

In the embodiment shown, apparatus 10 comprises a removable cover 94 (shown in FIG. 1B) configured to be coupled to at least one of the sidewalls (e.g., three (3) sidewalls 46, as shown) and to cover at least a portion of fourth opening 66. In the embodiment shown, removable cover 94 has a shelf portion 98 that extends away from housing 14 when the removable cover is coupled to the housing. For example, shelf portion 98 can function as a handle to assist a user in removing the removable cover from the housing. In the embodiment shown, removable cover 94 is releasably coupled to the housing through fasteners (e.g., thumb screws), however, in other embodiments, such coupling can be achieved through any suitable structure, such as, for example, other fasteners such as rivets, nuts and bolts, and/or the like, interlocking features of removable cover 94 and/or housing 14, a frictional fit, adhesive, tape, magnets, and/or the like. By way of further example, in other embodiments, an upper end of cover 94 can be pivotally coupled to at least one sidewall 46 (e.g., a sidewall 46 which defines most of opening 66).

In the embodiment shown, at least one of sidewalls 46 comprises an outer wall 110 (e.g., an outer skin) and an inner wall 114 (e.g., an inner skin) In this embodiment, at least a portion of a volume defined by and between the outer and inner walls is substantially empty to define an air gap 118. In this way, double-walled sidewalls 46 can aid in structural integrity, as well as provide an insulating air gap to minimize heat transfer to and/or from interior channel 18 and an outside environment. In some embodiments, air gap 118 and/or interior channel 18 can comprise an insulating material (e.g., to minimize heat transfer). In the embodiment shown, at least one (e.g., two, three, or all) of sidewalls 46 comprises a tubular frame member 122 disposed between outer wall 110 and inner wall 114 (e.g., resembling and/or comprising an inner skin and an outer skin, supported by a frame). For example, tubular frame member 122 can provide structural support for housing 14 (e.g., to support the weight of ice machine 30) and/or for coupling of door 78 and/or removable cover 94 to housing 14. Embodiments of the present riser apparatuses can comprise any suitable material, including, but not limited to, metals, such as, stainless steel, aluminum, copper, iron, alloys, and/or the like, composites such as plastics, carbon fiber, and/or the like, and/or the like.

Figure 2A:
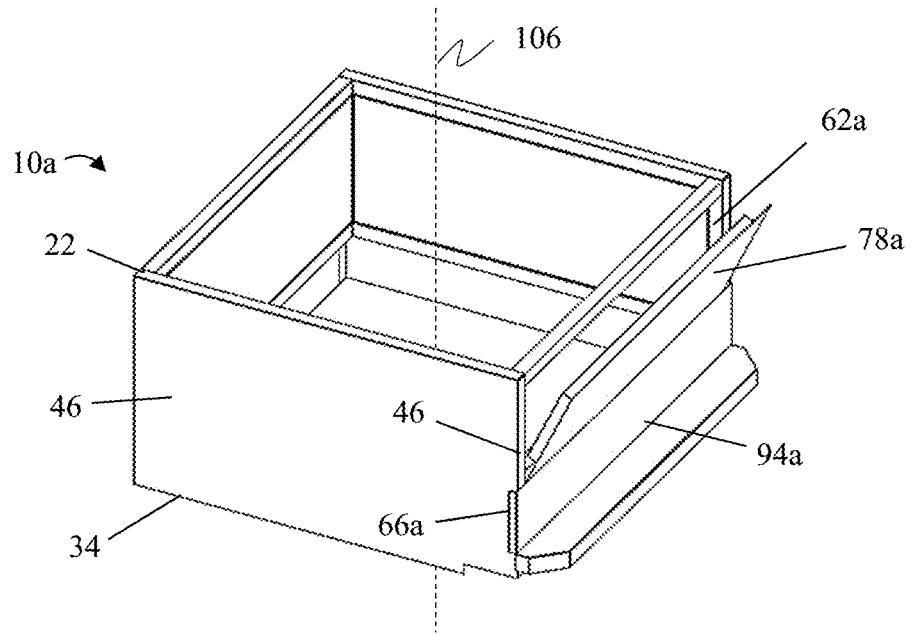
FIGS. 2A and 2B depict upper perspective and bottom views, respectively, of a second embodiment of the present ice machine riser apparatuses.
Figure 2B:
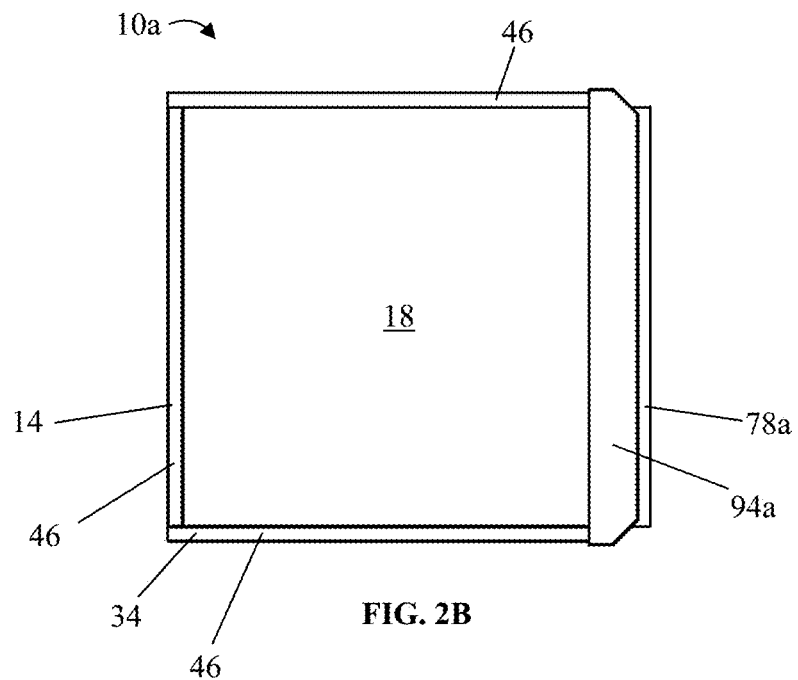

FIGS. 2A and 2B depict a second embodiment 10a of the present riser apparatuses. Apparatus 10a is substantially similar to apparatus 10, with the primary exception being that apparatus 10a is configured such that a single one of sidewalls 46 defines a majority of each of third opening 62a and fourth opening 66a (shown covered by removable cover 94a). In the embodiment shown, the third opening is disposed longitudinally (e.g., along longitudinal axis 106) between fourth opening 66a and first end 22 (e.g., as shown). In some embodiments, third opening 62a may be unitary with fourth opening 66a.

Some embodiments of the present methods for adding ice to, cleaning, or repairing an ice machine (e.g., 30), drink dispenser (e.g., 42), or riser apparatus (e.g., 10, 10a) coupled to the ice machine at a first end (e.g., 22) and coupled to the drink dispenser at a second end (e.g., 34) comprise opening a door (e.g., 78, 78a) attached to the riser apparatus to access an opening (e.g., 62, 62a) defined by one or more sidewalls (e.g., 46) of the riser apparatus, where the sidewalls extend from the first end to the second end and the opening is in direct communication with an interior channel (e.g., 18) of the riser apparatus.

The above specification and examples provide a complete description of the structure and use of exemplary embodiments.

Although certain embodiments have been described above with a certain degree of particularity, or with reference to one or more individual embodiments, those skilled in the art could make numerous alterations to the disclosed embodiments without departing from the scope of this invention. As such, the various illustrative embodiments of the present devices are not intended to be limited to the particular forms disclosed. Rather, they include all modifications and alternatives falling within the scope of the claims, and embodiments other than the one shown may include some or all of the features of the depicted embodiment. Further, where appropriate, aspects of any of the examples described above may be combined with aspects of any of the other examples described to form further examples having comparable or different properties and addressing the same or different problems. Similarly, it will be understood that the benefits and advantages described above may relate to one embodiment or may relate to several embodiments.

The claims are not intended to include, and should not be interpreted to include, means-plus- or step-plus-function limitations, unless such a limitation is explicitly recited in a given claim using the phrase(s) "means for" or "step for," respectively.

The invention claimed is:

1. A riser apparatus for mounting an ice machine above a drink dispenser, the riser apparatus comprising:
   a housing defining an interior channel, the housing comprising:
      a first end defining a first opening, the first end configured to be coupled to an ice machine such that ice can pass through the first opening and into the interior channel;
      a second end defining a second opening, the second end configured to be coupled to a drink dispenser such that ice can pass from the interior channel and out of the housing through the second opening; and
      one or more sidewalls extending between the first end and the second end, the one or more sidewalls defining third and fourth openings in direct communication with the interior channel;
   a door coupled to at least one of the one or more sidewalls such that the door selectively covers the third opening; and
   a cover member removably coupled to at least one of the one or more sidewalls such that the cover member covers at least a portion of the fourth opening.

2. The riser apparatus of claim 1, where a height of the housing is at least 35% of a minimum outer transverse dimension of the housing.

3. The riser apparatus of claim 1, where a single one of the sidewalls defines at least a majority of each of the third and fourth openings.

4. The riser apparatus of claim 1, where the third opening is disposed longitudinally between the fourth opening and the first end.

5. The riser apparatus of claim 1, where the third opening and the fourth opening are unitary.

6. The riser apparatus of claim 1, where the second opening and the fourth opening are unitary.

7. The riser apparatus of claim 1, where the removable cover has a shelf portion that extends away from the housing when the removable cover is coupled to the housing.

8. The riser apparatus of claim 1, where the third opening is angularly disposed at a non-parallel angle relative to the second opening.

9. The riser apparatus of claim 1, where the riser apparatus is configured to be coupled to the drink dispenser such that a portion of at least one of the sidewalls extends past an upper end of the drink dispenser.

10. The riser apparatus of claim 1, where the housing includes an internal ledge recessed from the second end and configured to rest on the drink dispenser.

11. The riser apparatus of claim 1, where the door is pivotally coupled to at least one of the sidewalls.

12. The riser apparatus of claim 1, where a lower end of the door is pivotally coupled to at least one of the sidewalls.

13. The riser apparatus of claim 1, where the door is pivotally coupled to the housing such that a maximum angular displacement of the door relative to the housing is limited to an acute angle.

14. The riser apparatus of claim 13, further comprising a releasable stop configured to limit the maximum angular displacement of the door relative to the housing to an acute angle.

15. The riser apparatus of claim 1, further comprising a latch configured to releasably secure the door in the closed position.

16. The riser apparatus of claim 1, where at least one of the sidewalls comprises an outer wall and an inner wall.

17. The riser apparatus of claim 16, where at least one of the sidewalls comprises a tubular frame member disposed between an outer wall and an inner wall.

18. The riser apparatus of claim 1, where the housing comprises stainless steel.

19. A riser apparatus for mounting an ice machine above a drink dispenser, the riser apparatus comprising:
   a housing defining an interior channel, the housing comprising:
      a first end defining a first opening, the first end configured to be coupled to an ice machine such that ice can pass through the first opening and into the interior channel;
      a second end defining a second opening, the second end configured to be coupled to a drink dispenser such that ice can pass from the interior channel and out of the housing through the second opening; and
      one or more sidewalls extending between the first end and the second end, the one or more sidewalls defining a third opening in direct communication with the interior channel, the third opening disposed at a non-parallel angle relative to the first opening; and
   a door coupled to at least one of the one or more sidewalls such that the door selectively covers the third opening.

20. The riser apparatus of claim 19, where a height of the housing is at least 35% of a minimum outer transverse dimension of the housing.

21. A method for adding ice to a drink dispenser, or cleaning or repairing an ice machine or drink dispenser, through a riser apparatus of claim 19 that is coupled to the ice machine at a first end of the riser apparatus and coupled to the drink dispenser at a second end of the riser apparatus, the method comprising:

opening the door of the riser apparatus to access the interior channel via the third opening.

\* \* \* \* \*